(12) United States Patent
Shinkawa

(10) Patent No.: US 8,115,975 B2
(45) Date of Patent: Feb. 14, 2012

(54) IMAGE SCANNING DEVICE AND COPIER

(75) Inventor: Shohei Shinkawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 372 days.

(21) Appl. No.: 12/461,092

(22) Filed: Jul. 31, 2009

(65) Prior Publication Data

US 2010/0033769 A1    Feb. 11, 2010

(30) Foreign Application Priority Data

Aug. 5, 2008    (JP) ................................ 2008-202288

(51) Int. Cl.
*H04N 1/04* (2006.01)

(52) U.S. Cl. ........ 358/474; 358/497; 358/486; 358/488; 399/379; 399/380

(58) Field of Classification Search .................. None
See application file for complete search history.

(56) References Cited

U.S. PATENT DOCUMENTS

| | | | | |
|---|---|---|---|---|
| 5,223,904 A | * | 6/1993 | Umezawa | 399/376 |
| 5,693,933 A | * | 12/1997 | Takasu et al. | 250/208.1 |
| 5,778,276 A | * | 7/1998 | Hasegawa | 399/17 |
| 5,900,950 A | * | 5/1999 | Hsu | 358/497 |
| 5,917,616 A | * | 6/1999 | Chou et al. | 358/488 |
| 5,973,797 A | * | 10/1999 | Tanaka et al. | 358/488 |
| 6,163,388 A | * | 12/2000 | Lee et al. | 358/488 |
| 6,734,996 B1 | * | 5/2004 | Lee | 358/486 |
| 6,965,461 B1 | * | 11/2005 | Chiang et al. | 358/497 |
| 7,187,479 B2 | * | 3/2007 | Togashi | 358/497 |
| 2009/0244649 A1 | * | 10/2009 | Shinkawa | 358/474 |
| 2009/0323135 A1 | * | 12/2009 | Shinkawa | 358/474 |

FOREIGN PATENT DOCUMENTS

| | | |
|---|---|---|
| JP | 10-173864 | 6/1998 |
| JP | 11-150634 | 6/1999 |
| JP | 11-196235 | 7/1999 |
| JP | 2006-254182 | 9/2006 |
| JP | 2007-266961 | 10/2007 |

* cited by examiner

*Primary Examiner* — Cheukfan Lee
(74) *Attorney, Agent, or Firm* — Harness, Dickey & Pierce, P.L.C.

(57) ABSTRACT

A disclosed image scanning device includes a pressing unit for pressing a document; an operation detection unit for detecting an opening operation and a closing operation of the pressing unit; a movable scanning unit for scanning the document; and a control unit for moving the movable scanning unit from a standby position to a document-size detection start position when the opening operation is detected and moving the movable scanning unit from the document-size detection start position to the standby position to determine a size of the document when the closing operation is detected. The control unit is configured to continue moving the movable scanning unit from the standby position to the document-size detection start position until the arrival of the movable scanning unit at the document-size detection start position is detected even if the pressing unit is operated.

7 Claims, 7 Drawing Sheets

IMAGE SCANNING DEVICE AND COPIER

BACKGROUND OF THE INVENTION

1. Field of the Invention

A certain aspect of the present invention relates to an image scanning device for scanning a document to obtain an image of the document and a copier for forming the image obtained by the image scanning device.

2. Description of the Related Art

In a general document scanning process performed by a scanner, a target surface of a document placed on a contact glass is illuminated through the contact glass with light emitted from a light source on a carriage of the scanner while moving the carriage along the target surface. The light reflected from the target surface of the document is guided into an image sensor. Thus, an image of the target surface is read in a sub-scanning direction, i.e., in a direction the carriage is moved.

Some scanners are capable of automatically determining the size of a document placed on a contact glass. For example, patent document 1 discloses a scanner capable of automatically determining the size of a document. The disclosed scanner includes a platen cover used as a pressing unit for pressing a document against a contact glass. The platen cover is configured to swing open and close around a hinge. When closed, the platen cover covers the entire area of the contact glass and presses a document placed on the contact glass. When opened, the platen cover is fully retracted from the space right above the contact glass into a substantially upright position. When an opening operation of the platen cover is detected by an opening/closing sensor, a carriage of the scanner is caused to move from a home position (standby position) at one end of a moving range of the carriage to a document-size detection start position. The document-size detection start position is set at a distance of several cm from the home position. Meanwhile, when a closing operation of the platen cover is detected by the opening/closing sensor, a document on the contact glass is scanned with an image sensor by moving the carriage from the document-size detection start position toward the home position to obtain an image of the document. The size in a main-scanning direction (a direction orthogonal to the direction of carriage movement) of the document is determined based on the obtained image. Also, the size in the sub-scanning direction of the document is determined based on a detection result from a document detection sensor used to detect the presence of a document on the contact glass at certain positions along the sub-scanning direction. Thus, the disclosed scanner can automatically determine the size of a document and therefore eliminates the need for the user to enter the size of the document.

[Patent document 1] Japanese Patent Application Publication No. 11-196235

However, with the disclosed scanner, certain operations of the platen cover by the user may cause a problem called "chattering" where the moving direction of the carriage is abruptly reversed. Take, for example, a case where a user notices that he/she has forgotten to bring a document while opening the platen cover, and then immediately closes the platen cover. Here, if the platen cover is closed before the carriage, which has been caused by the opening operation of the platen cover to start moving from the home position toward the document-size detection start position, reaches the document-size detection start position, the carriage abruptly starts moving in the reverse direction. Thus, when the platen cover is opened and closed within a short period of time, the moving direction of the carriage is abruptly reversed, i.e., chattering occurs. The chattering greatly stresses and may damage the carriage and its drive mechanism.

SUMMARY OF THE INVENTION

Aspects of the present invention provide an image scanning device and a copier including the image scanning device that solve or reduce one or more problems caused by the limitations and disadvantages of the related art.

According to an aspect of the present invention, an image scanning device includes an optically transparent document table; a pressing unit configured to press a document against the document table at a closed position, the pressing unit being movable between the closed position and an open position; an operation detection unit configured to detect an opening operation of the pressing unit from the closed position to the open position and a closing operation of the pressing unit from the open position to the closed position; a movable scanning unit holding a light source and configured to scan a target surface of the document by illuminating the target surface through the document table with light emitted from the light source while moving along the target surface; an image sensor configured to receive the light reflected from the target surface and to convert the light into image data; a control unit configured to move the movable scanning unit from a standby position to a document-size detection start position when the opening operation of the pressing unit is detected by the operation detection unit, to move the movable scanning unit from the document-size detection start position to the standby position to scan the document and thereby obtain the image data of the document when the closing operation of the pressing unit is detected by the operation detection unit, and to determine a size of the document based on the obtained image data; and a detection-start-position arrival detecting unit configured to detect arrival of the movable scanning unit at the document-size detection start position. The control unit is configured to continue moving the movable scanning unit from the standby position to the document-size detection start position until the arrival of the movable scanning unit at the document-size detection start position is detected by the detection-start-position arrival detecting unit even if another operation of the pressing unit is detected after starting to move the movable scanning unit from the standby position to the document-size detection start position based on the detection of the opening operation and to stop the movable scanning unit at the document-size detection start position.

DESCRIPTION OF THE PREFERRED EMBODIMENTS

Preferred embodiments of the present invention are described below with reference to the accompanying drawings.

Figure 1:
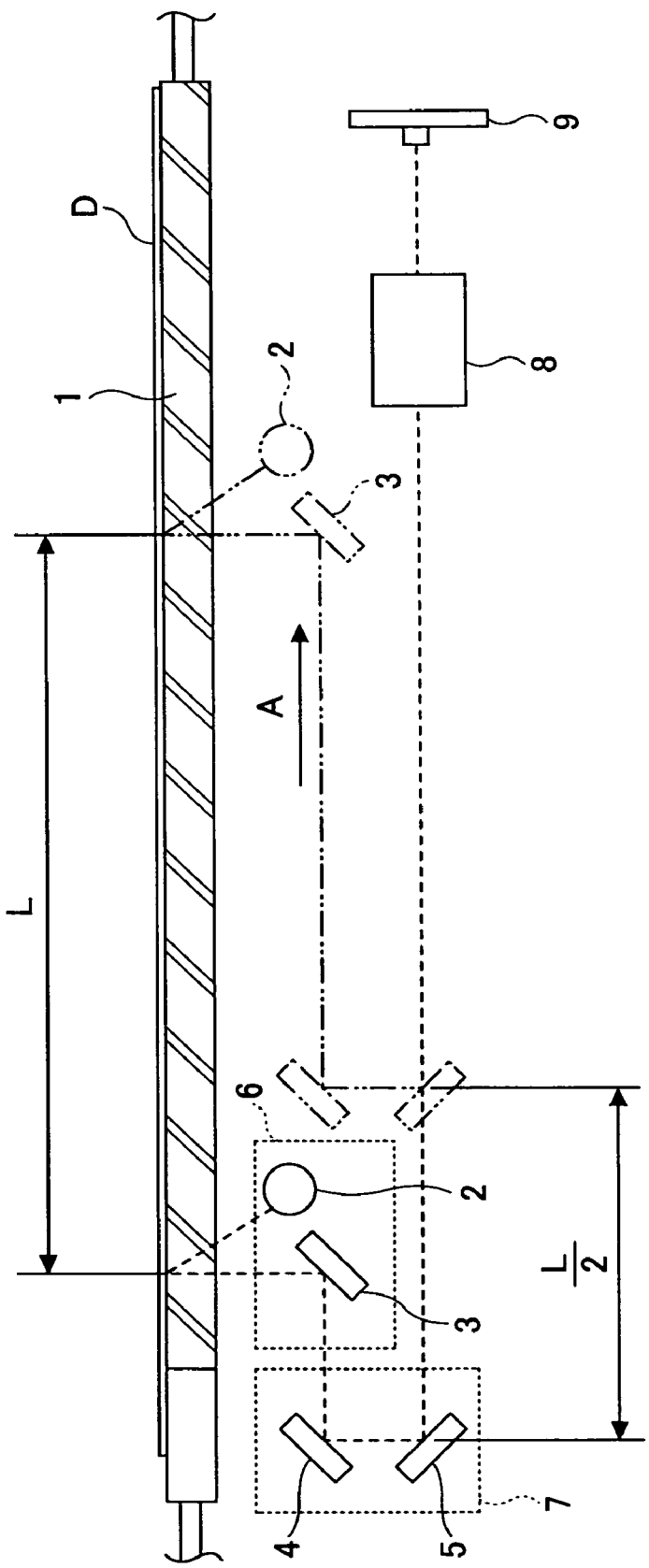
FIG. 1 is a schematic diagram of a scanner according to an embodiment of the present invention.

A scanner as an example of an image scanning device according to an embodiment of the present invention is described below. FIG. 1 is a schematic diagram of the scanner of this embodiment. The scanner of this embodiment includes a contact glass 1 used as a document table, a lamp 2 used as a light source, a first mirror 3, a second mirror 4, a third mirror 5, a first carriage 6 (may also be called a movable scanning unit), a second carriage 7, a lens 8, and a charge coupled device (CCD) 9. The contact glass 1 is made of transparent glass that transmits light well. A document D is placed on the contact glass 1 such that a target surface to be scanned of the document D faces the contact glass 1. The above described components other than the contact glass 1 are disposed below the contact glass 1.

The first carriage 6 holds the lamp 2 and the first mirror 3 and moves along the surface of the contact glass 1. While moving, the first carriage 6 illuminates the target surface of the document D through the contact glass 1 with light emitted from the lamp 2. The first mirror 3 receives the light reflected from the target surface.

The second carriage 7 holds the second mirror 4 and the third mirror 5 and moves along the surface of the contact glass 1 at a predetermined distance from the first carriage 6. The second mirror 4 and the third mirror 5 reflect the light from the first mirror 3 on the first carriage 6 and thereby cause the light to enter the lens 8. The light entering the lens 8 is focused on a light receiving surface of the CCD 9 and is converted into image data. The scanner of this embodiment is configured such that the first carriage 6 moves a distance L while the second carriage 7 moves a distance L/2. This configuration makes it possible to keep constant the optical path length of the optical system.

Figure 2:
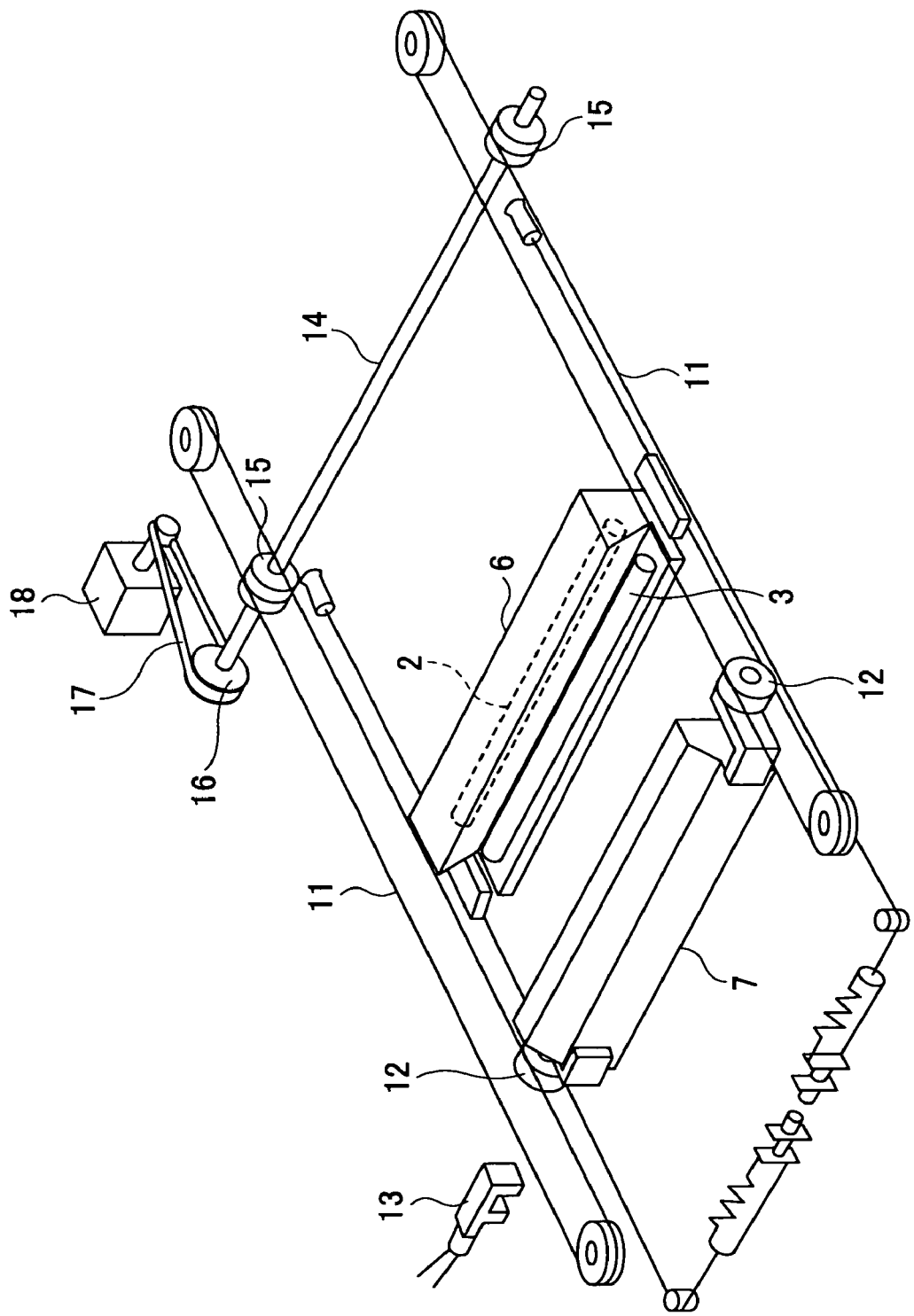
FIG. 2 is a perspective view of carriages and a carriage drive mechanism of the scanner of FIG. 1.

FIG. 2 is a perspective view of the first and second carriages 6 and 7 and a carriage drive mechanism of the scanner of this embodiment. As shown in FIG. 2, the first carriage 6 holding the lamp 2 and the first mirror 3 is attached to drive wires 11. The drive wires 11 are also wound around pulleys 12 rotatably attached to the second carriage 7 holding the second mirror 4 and the third mirror 5. Further, the drive wires 11 are wound around wire pulleys 15 fixed to a drive shaft 14. The drive shaft 14 is connected via a timing pulley 16 and a timing belt 17 to a drive motor 18. With this configuration, the first carriage 6 and the second carriage 7 are caused to move in the sub-scanning direction by the torque generated by the drive motor 18.

One end of a moving range of the first carriage 6 in the sub-scanning direction is a home position or a standby position of the first carriage 6. At a position slightly closer to the other end of the moving range than the home position, the first carriage 6 is detected by a position sensor 13. In other words, the home position is at a preset distance from the detection position of the position sensor 13. In this embodiment, it is assumed that a stepping motor is used as the drive motor 18. The number of drive pulses supplied to the stepping motor correlates highly with the moving distance of the first carriage 6. Therefore, it is possible to accurately determine the position of the first carriage 6 in the sub-scanning direction by counting the number of drive pulses supplied to the drive motor 18 from when the first carriage 6 is detected by the position sensor 13.

Figure 3:
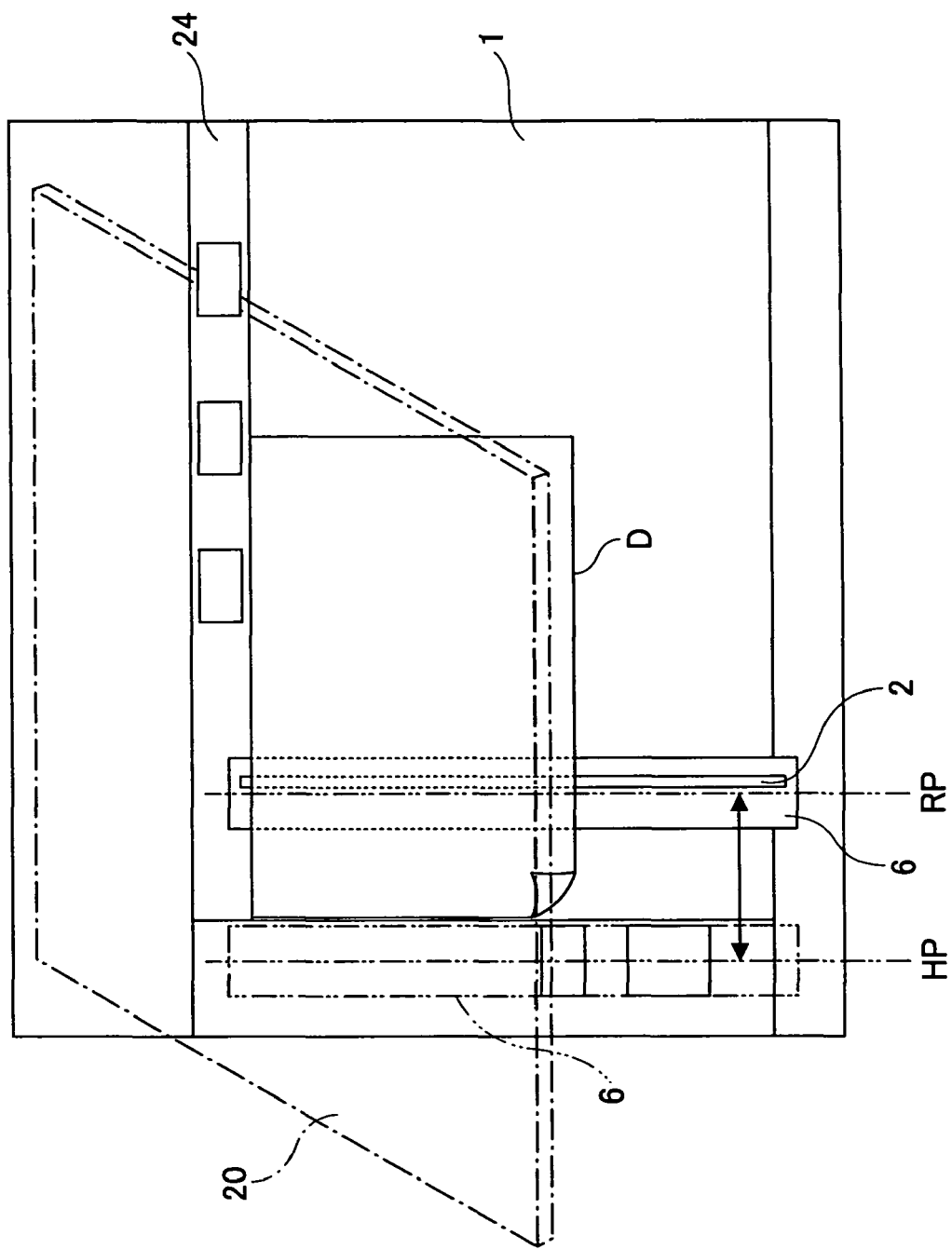
FIG. 3 is a plan view of the scanner of FIG. 1.

FIG. 3 is a plan view of the scanner of this embodiment. In FIG. 3, the first carriage 6 is indicated by a dashed double-dotted line and a solid line at different positions. The first carriage 6 in the home position HP is indicated by the dashed double-dotted line. Meanwhile, the first carriage 6 in a document-size detection start position RP is indicated by the solid line. The document-size detection start position RP is described later.

Figure 4:
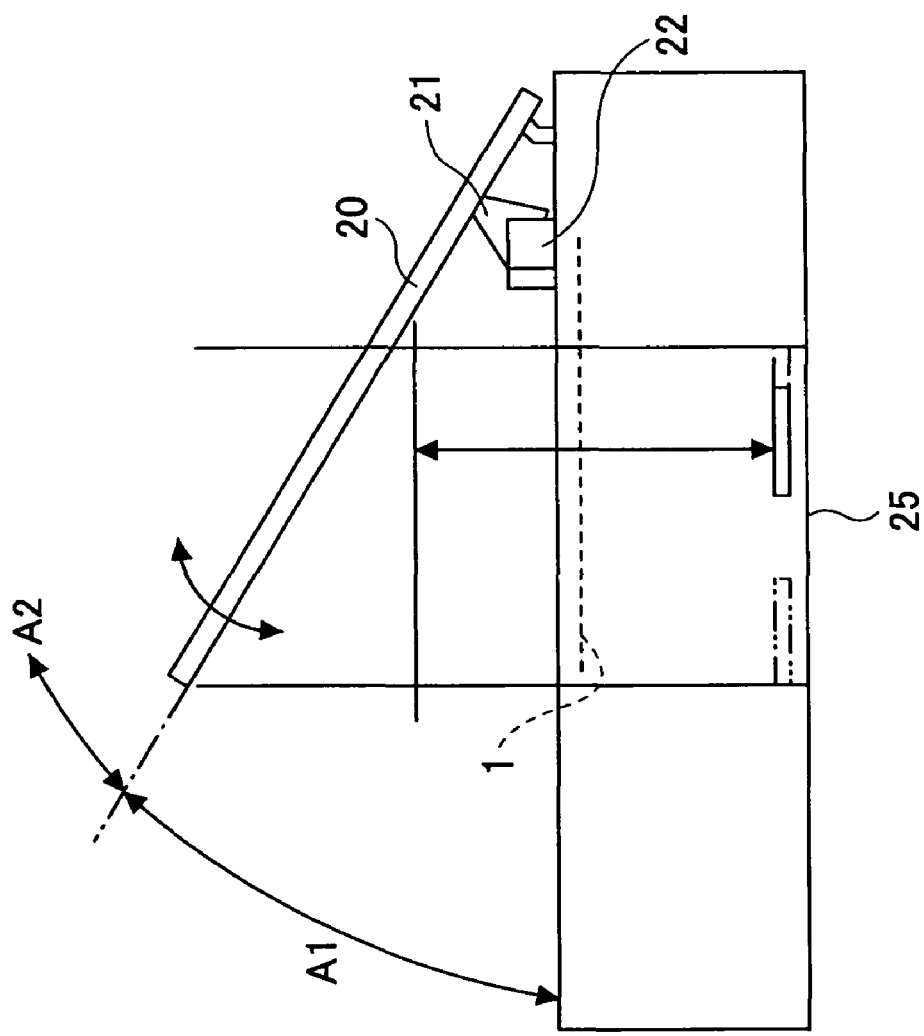
FIG. 4 is a side view of the scanner of FIG. 1.

FIG. 4 is a side view of the scanner of this embodiment. As shown in FIG. 4, the scanner of this embodiment further includes a platen cover 20 used as a pressing unit. The platen cover 20 is configured to swing open and close around a hinge. In FIG. 4, the platen cover 20 is opened to a certain angle. When fully opened, the platen cover 20 is retracted from the space right above the contact glass 1 into a substantially upright position. When fully closed, the platen cover 20 covers the entire area of the contact glass 1 and presses a surface, which is opposite to the target surface, of the document D against the contact glass 1.

In the body of the scanner of this embodiment, at least one document detection sensor 25 is provided to detect a document placed on the contact glass 1 at one or more positions in the sub-scanning direction. The document detection sensor 25 includes a light-emitting element (not shown) for emitting a light beam toward the contact glass 1 and a light-receiving element (not shown) for receiving light reflected from a document on the contact glass 1. The scanner of this embodiment also includes a control unit (not shown) including a central processing unit (CPU) used as an arithmetic unit and a random access memory (RAM) used as a data storage unit. The control unit determines the size in the sub-scanning direction of a document based on a document detection result from the document detection sensor 25. Either plural document detection sensors 25 arranged along the sub-scanning direction or one document detection sensor 25 disposed at a position in the sub-scanning direction may be provided. When plural document detection sensors 25 are provided, the control unit can fairly accurately determine the size in the sub-scanning direction of a document based on document detection results from the respective document detection sensors 25. When only one document detection sensor 25 is provided, the control unit roughly (e.g., less than XX mm or greater than or equal to XX mm) determines the size in the sub-scanning direction of a document based on a document detection result from the document detection sensor 25. An ultrasonic sensor or an infrared sensor may instead be used as the document detection sensor 25.

A photo interrupter sensor 22 used as an operation detection unit is disposed near the hinge swingably supporting the platen cover 20. Also, a detection plate 21 is fixed to a back side of the platen cover 20 at a position near the hinge. When the platen cover 20 is closed to a certain angle, the detection plate 21 is detected by the photo interrupter sensor 22 and an output signal from the photo interrupter sensor 22 is turned on. Meanwhile, when the platen cover 20 is opened to a relatively large angle, the photo interrupter sensor 22 becomes unable to detect the detection plate 21 and the output signal from the photo interrupter sensor 22 is turned off.

Here, if the document detection sensor 25 is caused to detect the presence of a document when the platen cover 20 is closed with no document on the contact glass 1, the document detection sensor 25 may mistakenly detect the platen cover 20 as a document. That is, a light beam emitted from the light-emitting element of the document detection sensor 25 is reflected by the back side of the platen cover 20, the reflected light is received by the light-receiving element of the document detection sensor 25, and as a result, an output signal from the document detection sensor 25 is turned on. To prevent a problem caused by such a false detection, it is necessary to determine the presence of a document based on the output signal from the document detection sensor 25 while the platen cover 20 is out of the detection range of the document detection sensor 25. The document detection sensor 25 can detect the platen cover 20 while the platen cover 20 is in a range (detectable range) between the closed position (a position where the platen cover 20 presses a document) and a certain angle position. In other words, the document detection sensor 25 cannot detect the platen cover 20 while the platen cover 20 is out of the detectable range (is in an undetectable range). In FIG. 4, A1 indicates a part of the moving range of the platen cover 20 which corresponds to the detectable range where the document detection sensor 25 may mistakenly detect the platen cover 20 as a document. Also in FIG. 4, A2 indicates a part of the moving range of the platen cover 20 which corresponds to the undetectable range where the document detection sensor 25 does not mistakenly detect the platen cover 20 as a document.

The size of the detection plate 21 is determined such that the output signal from the photo interrupter sensor 22 is turned on and off at the boundary between the detectable range A1 and the undetectable range A2. Accordingly, when the platen cover 20 is fully closed, the output signal from the photo interrupter sensor 22 is on. When the fully closed platen cover 20 starts to be opened and is moved from the detectable range A1 to the undetectable range A2, the output signal from the photo interrupter sensor 22 is turned off. When the platen cover 20 is fully opened, the output signal from the photo interrupter sensor 22 is off. When the fully-opened platen cover 20 starts to be closed and is moved from the undetectable range A2 to the detectable range A1, the output signal from the photo interrupter sensor 22 is turned on.

When the output signal from the photo interrupter sensor 22 is turned off (changes from ON to OFF), the control unit detects an opening operation (pressure releasing operation) of the platen cover 20. Meanwhile, when the output signal from the photo interrupter sensor 22 is turned on (changes from OFF to ON), the control unit detects a closing operation (pressure applying operation) of the platen cover 20.

Figure 5:
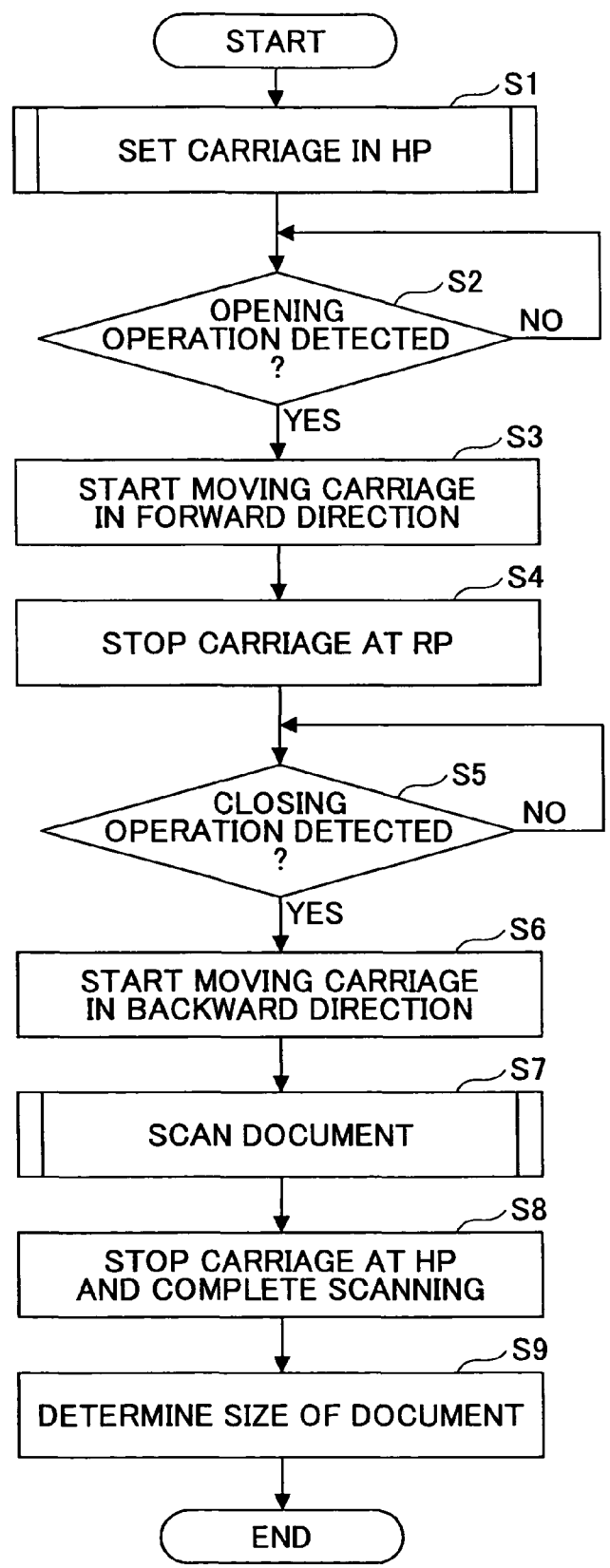
FIG. 5 is a flowchart showing a control process performed by a control unit of the scanner of FIG. 1.

Next, operations of the scanner of this embodiment are described. In the descriptions below, the moving direction of the first carriage 6 from the home position HP toward the document-size detection start position RP is called a forward direction. Meanwhile, a direction opposite to the forward direction is called a backward direction. FIG. 5 is a flowchart showing a control process performed by the control unit of the scanner of this embodiment. The control process is started when the power of the scanner is turned on. When the power is turned on, a carriage setting step is first performed (step 1: S1). In the carriage setting step, the first carriage 6 is set in the home position HP. Normally, the first carriage 6 is already in the home position HP when the power is turned on. There is, however, a case where the first carriage 6 is not in the home position HP when the power is turned on because, for example, the power has been turned off when the first carriage 6 is still moving. For this reason, the carriage setting step is performed just after the power is turned on. In the carriage setting step, the control unit monitors a timing at which the first carriage 6 passes by a position facing the position sensor 13 while moving the first carriage 6 in the forward direction. The control unit temporarily stops the drive motor 18 after supplying a predetermined number of drive pulses to the drive more 18 from the monitored timing, and then causes the drive motor 18 to rotate in the reverse direction. After reversing the rotational direction, the control unit supplies a predetermined number of drive pulses to the drive motor 18 and then stops the drive motor 18 to set the first carriage 6 in the home position HP. In this embodiment, it is assumed that the document D is not set in an area between the position facing the position sensor 13 (hereafter called a position sensor facing position) and the home position HP. In other words, the document D is set in an area extending in the forward direction from the position sensor facing position.

The control unit keeps the first carriage 6 in the home position HP until an opening operation of the platen cover 20 is detected based on the output signal from the photo interrupter sensor 22 (NO in S2). If an opening operation of the platen cover 20 is detected (YES in S2), the control unit starts to move the first carriage in the forward direction (S3). In this embodiment, as described above, detection of an opening operation of the platen cover 20 indicates that the platen cover 20 has been opened as widely as to enter the undetectable range A2.

Once the control unit starts to move the first carriage 6 in the forward direction, the control unit continues to move the first carriage 6 until it reaches the document-size detection start position RP even if an opening or closing operation of the platen cover 20 is detected (S4). In this embodiment, the control unit determines whether the first carriage 6 has reached the document-size detection position RP based on the number of drive pulses supplied to the drive motor 18 from when the movement of the first carriage 6 is started. In other words, the control unit supplies a predetermined number of drive pulses to the drive motor 18 after setting the first carriage 6 in the home position (after putting the first carriage 6 into a standby state) and determines that the first carriage 6 is in the document-size detection start position RP (in a detection ready state) when completing the supply of the predetermined number of drive pulses. In this embodiment, the control unit for controlling the number of drive pulses supplied to the drive motor 18 and the position sensor 13 collectively function as a detection-start-position arrival detecting unit (detection ready state detecting unit) for detecting arrival of the first carriage 6 at the document-size detection start position (or detecting that the first carriage 6 is in the detection ready state).

The control unit stops and keeps the first carriage 6 in the document-size detection start position RP until a closing operation of the platen cover 20 is detected (NO in S5). If a closing operation of the platen cover 20 is detected (YES in S5), the control unit starts to move the first carriage 6 in the backward direction and turns on the lamp 2 to scan the document D (S6). The control unit continues to move the first carriage 6 and to scan the document D until the first carriage 6 reaches the home position HP even if an opening or closing operation of the platen cover 20 is detected (S7, S8). The control unit, for example, obtains image data of a continuous portion of the document D or a series of portions of the document D by the scanning. Also, the control unit may be configured to scan the document D multiple times to improve the accuracy in detecting the document size. The presence of a document in the main-scanning direction is determined, for example, by comparing the luminance of respective dots in the image data with a threshold. If the luminance of a dot is greater than the threshold, it indicates that a document is present at the corresponding position.

In this embodiment, the control unit supplies a predetermined number of drive pulses to the drive motor 6 to move the first carriage 6 in the backward direction after the first carriage 6 reaches the position sensor facing position, and determines that the first carriage 6 is in the home position HP or in the standby state when completing the supply of the predetermined number of drive pulses. Thus, in this embodiment, the control unit for controlling the number of drive pulses supplied to the drive motor 18 and the position sensor 13 collectively function as a standby-position arrival detecting unit (standby state detecting unit) for detecting arrival of the first carriage 6 at the home/standby position (or detecting that the first carriage 6 is in the standby state).

Although omitted for brevity, a step of determining the size in the sub-scanning direction of the document D based on an output signal from the document detection sensor 25 is performed in parallel with steps S3 through S5 shown in FIG. 5. The step of determining the size in the sub-scanning direction of the document D is performed before a closing operation of the platen cover 20 is detected in step S5. That is, the step of determining the size in the sub-scanning direction of the document D is performed while the platen cover 20 is in the undetectable range A2. This configuration makes it possible to prevent the document detection sensor 25 from mistakenly detecting the platen cover 20 as the document D.

After stopping the first carriage 6 at the home position HP, the control unit determines the size in the main-scanning direction of the document D based on the obtained image data and determines the overall size (dimensions) of the document D based on the determined sizes in the main-scanning and sub-scanning directions (S9).

With the above configuration of the scanner of this embodiment, once the movement of the first carriage 6 in the forward direction is started based on the detection of an opening operation of the platen cover 20, the forward movement is continued until the first carriage 6 reaches the document-size detection start position RP even if another operation of the platen cover 20 is detected. This in turn prevents chattering of the first carriage 6 even when the user opens and closes the platen cover 20 within a short period of time.

Also with the above configuration, once the movement of the first carriage 6 in the backward direction is started based on the detection of a closing operation of the platen cover 20, the backward movement is continued until the first carriage 6 reaches the home position HP even if another operation of the platen cover 20 is detected. This in turn prevents chattering of the first carriage 6 even when the user opens and closes the platen cover 20 within a short period of time.

As the photo interrupter sensor 22, an inexpensive photosensor that includes no Schmitt circuit and has unstable outputs may be used because the above configuration also prevents chattering of the first carriage 6 due to unstable sensor outputs. This in turn makes it possible to reduce the costs of a scanner. For example, an output signal from an inexpensive photosensor including no Schmitt circuit may be repeatedly turned on and off (becomes unstable) when the amount of light coming into the light-receiving element of the photosensor is near a threshold for turning on and off the output signal, i.e., when the platen cover 20 is half-opened. The configuration of the above embodiment prevents chattering of the first carriage 6 even when a sensor output signal fluctuates and therefore makes it possible to reduce the costs of a scanner by using an inexpensive photosensor including no Schmitt circuit as the photo interrupter sensor 22.

As described above, the scanner of this embodiment includes the document detection sensor 25 used as a document detection unit to detect the document D placed on the contact glass 1 used as a document table. Also, the photo interrupter sensor 22 used as an operation detection unit of the scanner is configured to detect an opening operation (pressure releasing operation) of the platen cover 20 where the platen cover 20 is opened from a closed position (pressure position) to an open position (non-pressure position) in the undetectable range A2 in which the platen cover 20 is not detected by the document detection sensor 25 as a document. This configuration makes it possible to determine whether the platen cover 20 is in the undetectable range A2 based on an output signal from the photo interrupter sensor 22.

Figure 6:
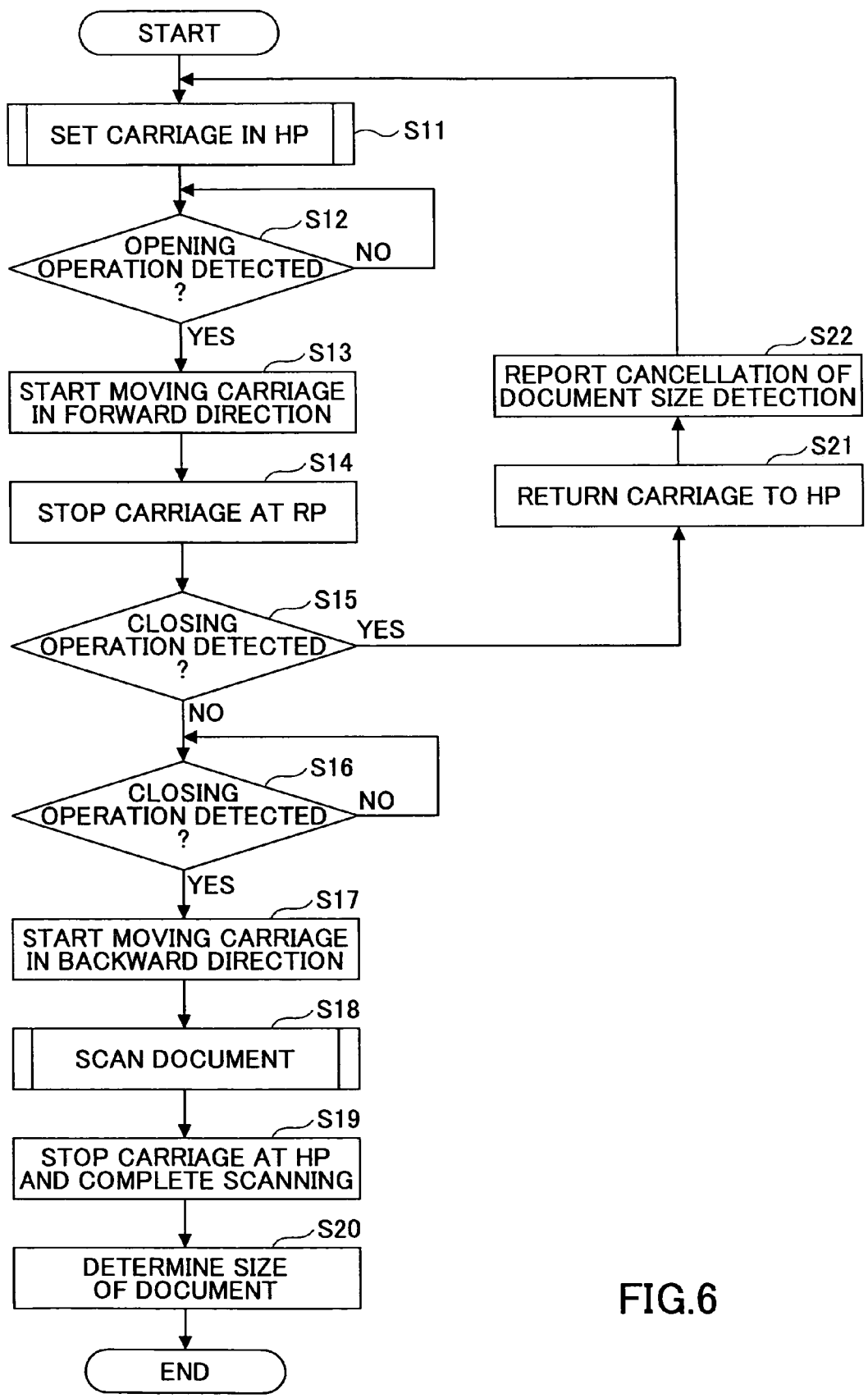
FIG. 6 is a flowchart showing another control process performed by a control unit of the scanner of FIG. 1.

Next, a scanner according to another embodiment of the present invention is described. Unless otherwise mentioned, the configuration of the scanner of this embodiment is substantially the same as that of the scanner of the above embodiment. FIG. 6 is a flowchart showing a control process performed by a control unit of the scanner of this embodiment. In the control process, steps (S11 through S14) for moving the first carriage 6 from the home position HP to the document-size detection start position RP are substantially the same as those shown in FIG. 5. Just after setting the first carriage 6 in the document-size detection start position RP (S14), the control unit determines whether a closing operation of the platen cover 20 is detected (S15). If a closing operation is detected (YES in S15), the control unit returns the first carriage 6 to the home position HP (S21) without performing the scanning steps (S17 through S19) for document size detection. In this case, the control unit does not turn on the lamp 2.

Steps S14 and S15 are performed with substantially no interval between them. Therefore, if a closing operation is detected in S15, it indicates that the output signal from the photo interrupter sensor 22 is turned on just when or immediately after the first carriage 6 has reached the document-size detection start position RP. In this case, it is highly possible that the platen cover 20 has been closed without placing the document D on the contact glass 1. Normally, it takes some time for a user to open the platen cover 20, place the document D in a proper position on the contact glass 1, and close the platen cover 20. In other words, it is difficult for a user to place the document D on the contact glass 1 and close the platen cover 20 in time to be detected at step S15. For this reason, if a closing operation is detected in step S15, the control unit returns the first carriage 6 to the home position HP without performing the scanning steps for document size detection. In this case, the control unit reports cancellation of document size detection to the user by, for example, causing a display used as a reporting unit to display a message. Alternatively, the control unit may be configured to report the cancellation of document size detection to the user by turning on a lamp made of, for example, a LED. The control unit is preferably configured to report the cancellation of document size detection while returning the first carriage 6 to the home position HP so that the cancellation is reported before the user presses, for example, a copy start button.

Meanwhile, when no closing operation of the platen cover 20 is detected (NO in S15), the control unit waits until a closing operation is detected (NO in S16). If a closing operation of the platen cover 20 is detected (YES in S16), the control unit performs the scanning steps (S17 through S19) for document size detection.

The above configuration makes it possible to reduce occurrence of a problem that the scanning steps for document size detection are performed even when the platen cover 20 is closed without placing a document on the contact glass 1. This in turn prevents the lamp 2 from being turned on unnecessarily and thereby makes it possible to save energy.

Figure 7:
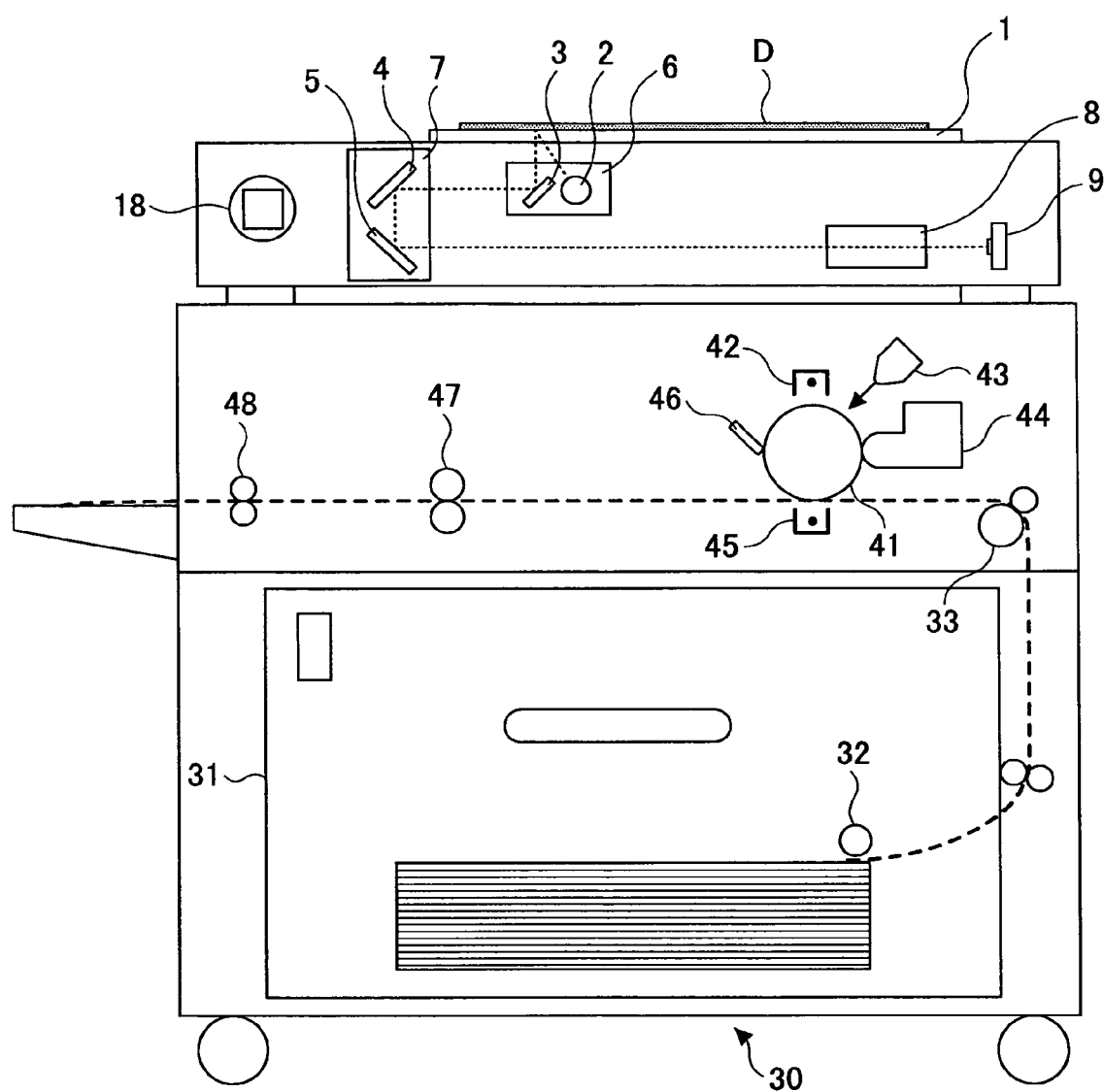
FIG. 7 is a schematic diagram of a copier according to an embodiment of the present invention.

FIG. 7 is a schematic diagram of a copier 30 according to an embodiment of the present invention. As shown in FIG. 7, the copier 30 includes the scanner of any one of the above embodiments as an image scanning device for optical scanning. The copier 30 also includes a paper-feed tray 31 for holding paper sheets (or any other types of recording media) and a paper-separating unit 32 for separating and feeding the paper sheets in the paper-feed tray 31 one by one.

The copier 30 further includes resist rollers 33 for feeding each paper sheet from the paper-feed tray 31 at a given timing into an image forming unit of the copier 30. The image forming unit is configured to form an image on the paper sheet and includes an image carrier 41, a charging unit 42, a latent image forming unit 43, a developing unit 44, a transfer unit 45, a cleaning unit 46, a fusing unit 47, and paper-eject rollers 48.

A control circuit (not shown) of the copier 30 of this embodiment controls the scanner for optical scanning, drives the first and second carriages 6 and 7 and the rollers for feeding paper sheets, and controls image scanning and image forming processes.

After the size of a document D placed on the contact glass 1 is detected by the scanner, the control circuit causes a drive control unit to control a motor driver for driving the drive motor 18 according to a user command. The drive control unit calculates a difference between an angular speed measured by an encoder of the drive motor 18 and a desired angular speed, and performs feedback control on the motor driver based on the calculated difference.

An image signal from the CCD 9 is input to the image processing unit. In the image processing unit, the latent image forming unit 43 forms a latent image on the image carrier 41 based on the image signal, and the developing unit 44 develops the latent image and thereby forms a toner image. Then, the transfer unit 45 transfers the toner image onto the paper sheet being conveyed, the fusing unit 47 fuses the transferred toner image onto the paper sheet, and the paper-eject rollers 48 eject the paper sheet.

An aspect of the present invention provides an image scanning device and a copier including the image scanning device that make it possible to prevent chattering of a movable scanning unit which is caused when a pressing unit such as a platen cover of the image scanning device is opened and closed by the user within a short period of time.

According to an aspect of the present invention, once a forward movement of a movable scanning unit from a standby position toward a document-size detection start position is started after detection of an opening operation (pressure releasing operation) of a pressing unit, the forward movement of the movable scanning unit toward the document size detection start position is continued even if the pressing unit is operated during the forward movement. In other words, the moving direction of the movable scanning unit is not reversed even if a closing operation (pressure applying operation) of the pressing unit is detected during the forward movement of the movable scanning unit. After reaching the document-size detection start position, the movable scanning unit is stopped temporarily and then caused to start moving toward the standby position to scan a document. This configuration makes it possible to prevent chattering of the movable scanning unit (where the moving direction of the movable scanning unit is abruptly changed) even when the user opens and closes the pressing unit within a short period of time.

The present invention is not limited to the specifically disclosed embodiments, and variations and modifications may be made without departing from the scope of the present invention.

The present application is based on Japanese Priority Application No. 2008-202288, filed on Aug. 5, 2008, the entire contents of which are hereby incorporated herein by reference.

What is claimed is:
1. An image scanning device, comprising:
an optically transparent document table;
a pressing unit configured to press a document against the document table at a closed position, the pressing unit being movable between the closed position and an open position;
an operation detection unit configured to detect an opening operation of the pressing unit from the closed position to the open position and a closing operation of the pressing unit from the open position to the closed position;
a movable scanning unit holding a light source and configured to scan a target surface of the document by illuminating the target surface through the document table with light emitted from the light source while moving along the target surface;
an image sensor configured to receive the light reflected from the target surface and to convert the light into image data;
a control unit configured to move the movable scanning unit from a standby position to a document-size detection start position when the opening operation of the pressing unit is detected by the operation detection unit, to move the movable scanning unit from the document-size detection start position to the standby position to scan the document and thereby obtain the image data of the document when the closing operation of the pressing unit is detected by the operation detection unit, and to determine a size of the document based on the obtained image data; and
a detection-start-position arrival detecting unit configured to detect arrival of the movable scanning unit at the document-size detection start position,
wherein the control unit is configured to continue moving the movable scanning unit from the standby position to the document-size detection start position until the arrival of the movable scanning unit at the document-size detection start position is detected by the detection-start-position arrival detecting unit even if another operation of the pressing unit is detected after starting to move the movable scanning unit from the standby position to the document-size detection start position based on the detection of the opening operation and to stop the movable scanning unit at the document-size detection start position.

2. The image scanning device as claimed in claim 1, further comprising:
a standby-position arrival detecting unit configured to detect arrival of the movable scanning unit at the standby position,
wherein the control unit is configured to continue moving the movable scanning unit from the document-size detection start position to the standby position until the arrival of the movable scanning unit at the standby position is detected by the standby-position arrival detecting unit even if another operation of the pressing unit is detected after starting to move the movable scanning unit from the document-size detection start position to the standby position based on the detection of the closing operation and to stop the movable scanning unit at the standby position.

3. The image scanning device as claimed in claim 1, further comprising:
a document detection unit configured to detect the document placed on the document table,
wherein the operation detection unit is configured to detect the opening operation of the pressing unit from the closed position to the open position at which the pressing unit is undetectable by the document detection unit.

4. The image scanning device as claimed in claim 3, wherein the control unit is configured to move the movable scanning unit from the document-size detection start position to the standby position without turning on the light source if the closing operation of the pressing unit is detected by the operation detection unit just when or immediately after the arrival of the movable scanning unit at the document-size detection start position is detected by the detection-start-position arrival detecting unit.

5. The image scanning device as claimed in claim 4, wherein the control unit is configured to cancel a process of determining the size of the document based on the obtained image data when moving the movable scanning unit from the document-size detection start position to the standby position without turning on the light source.

6. The image scanning device as claimed in claim 5, further comprising:

a reporting unit configured to report the cancellation of the process of determining the size of the document to a user.

7. A copier, comprising:

the image scanning device as claimed in claim 1 for scanning the document to obtain an image of the document; and an image forming unit configured to form the obtained image on a recording medium.

* * * * *